Dec. 15, 1931.  L. VAN GELDER  1,837,085
TRAFFIC MIRROR
Filed Sept. 30, 1929
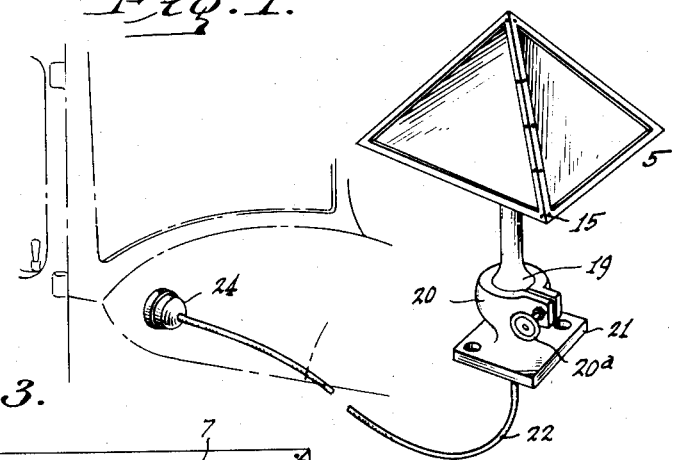
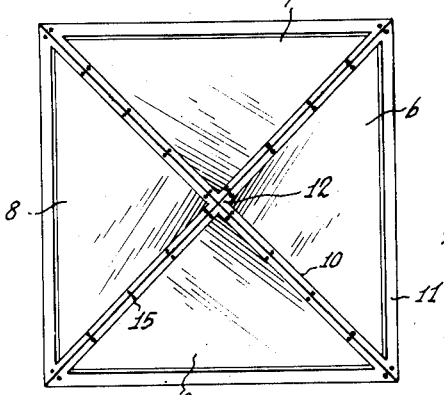
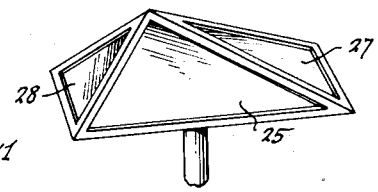
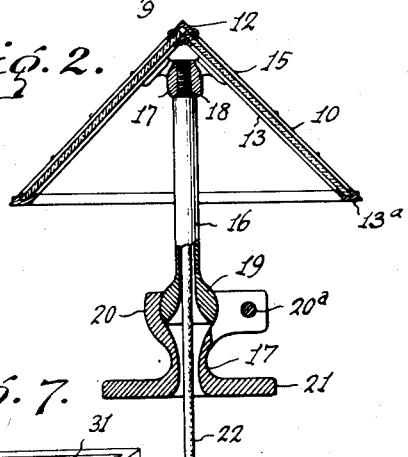
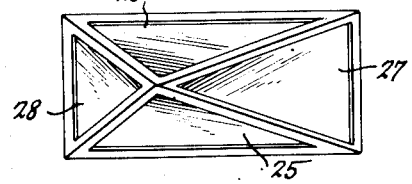
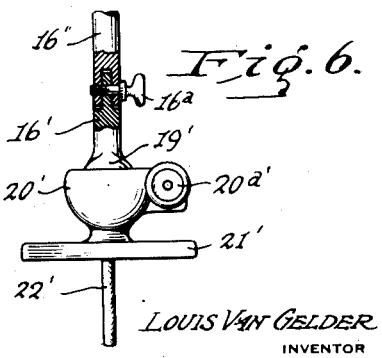
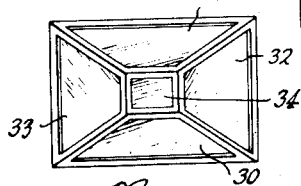
LOUIS VAN GELDER
INVENTOR
BY Victor J. Evans
ATTORNEY Patented Dec. 15, 1931

1,837,085

UNITED STATES PATENT OFFICE

LOUIS VAN GELDER, OF HACKENSACK, NEW JERSEY

TRAFFIC MIRROR

Application filed September 30, 1929. Serial No. 396,268.

This invention relates to improvements in traffic observing mirrors for automobiles and similar road vehicles, or for other vehicles, and its leading object is to provide a mirror with a plurality of reflecting surfaces disposed in various angular relations to each other, to enable a driver or other person to observe the surroundings from all angles to the vehicle, above the road, to the right and left, and rearwardly.

Another object of the invention is the provision of a traffic mirror of this construction with means operable from the driver's seat, for turning the composite observing mirror to any desired relation on the carrying vehicle, to enable the driver to more clearly follow any object or person observed.

Other objects and advantages of the invention will be hereinafter specifically pointed out, or will become apparent, as the specification proceeds:

With the above and other indicated objects in view, the invention resides in certain novel constructions, combinations and arrangements of parts, clearly described in the following specification, and fully illustrated in the accompanying drawings, which show an embodiment of the invention, as at present preferred, and in which:—

Fig. 1 is a view in perspective of the improved traffic mirror, showing the remote dash control therefor.

Fig. 2 is a vertical sectional view through the composite mirror.

Fig. 3 is a top plan view thereof.

Figure 4 is a perspective view of a modified mirror construction.

Figure 5 is a plan view thereof.

Figure 6 is mainly a fragmentary elevational view, partly in section, of a modified form of supporting means for the mirror.

Figure 7 is a view similar to Figure 5, but showing still another modification.

Referring to the accompanying drawings illustrating the invention in detail, and referring first to Figures 1, 2 and 3, 5 designates a mirror head, which is shown to be of pyramidical shape, thus forming a plurality of triangular reflecting surfaces. In making the mirror, individual pieces of mirror glass or other reflecting material may be used, in which case the individual pieces of mirror glass are cut in the form of the desired triangular form. In the construction shown in Figures 1 and 2 four individual pieces of glass or polished metal mirrors, indicated at 6, 7, 8 and 9 are used. These pieces are of triangular shape.

As shown in said Figures 1, 2 and 3, the mirror sections are retained in position by means of an upper pyramidal frame 10, and a lower pyramidal frame 13, the former consisting of a body providing a series of convergingly established triangular openings, one of such openings on each side of the pyramid, to expose the major areas of the mirror sections, and cover but the marginal portions thereof. This upper frame or skeleton body 10 is thus provided with angular corner bars and connecting base bars, these latter being marked 11. The central upper portion or apex of the skeleton frame is indicated at 12.

The bottom frame 13 has triangular faces to match the areas of the mirror sections; or, as shown in Figure 2, the base bars 11 may be omitted from the upper or skeleton frame 10, to make of such frame a non-uniplanar spider, and the sides of the inner frame may be correspondingly shortened, and a base frame 13a, of substantially U-shaped cross section all around, may be added as a third framing element. The upper frame or body 10 is secured to the inner or lower frame 13 by means of the connecting screws 15; and where the base frame 13a is present, this frame 13a and the other parts may be variously secured in place, to lock the entire assembly together. Thus, if the mirrors are metal, screws may be sent through the frame 10, or through the frame 13a and into the mirrors but not necessarily into the frame 13. Again, if the mirrors are glass, such screws may be sent through suitable but not shown holes or edge cut-outs in the mirrors and into the frame 13 and into the inner flanges of the frame 13a, or such screws may be wholly dispensed with and the abutting edges of the frames 13a and 13, and the abutting edges of the frames 13a and 10, may be permanently connected, as by brazing.

This composite mirror head is mounted upon the tubular upright or post 16, through the tubular socket 17 which is formed integral with the inner frame 13, and its position is adjusted by means of the screw 18, which is threaded in the socket against the upper end portion of the post 16.

The post is equipped on its lower end with a ball element 19 which has angular adjustment, on loosening a screw 20a, in a spherical socket 20 formed in the base holding member 21, which is connected by means of screws or the like with a part of the automobile body, such as the forward end thereof.

The post 16 turns in the ball element 19 by the flexible cable 22, which extends through a fixed conduit 23 to the dash board of the vehicle. The cable is thus operated by means of a handle knob 24, which works against the rear face of the dash or instrument board.

In Figures 4 and 5 I show a modified construction of the mirror head, wherein two side triangular mirrors 25 and 26 are provided, which are equal to each other, and two end triangular mirrors 27 and 28 are provided, which are unequal to each other. The mirror section 28 is smaller than the mirror section 27.

In Fig. 6 another modified construction is shown, where a substitute for the post 16 of Figure 2 is shown as including two sections 16' and 16'', adjustable into and out of axial alignment between a loosening and tightening of the clamping means illustrated and including a screw 16a; the parts marked 19', 20', 20a', 21' and 22' corresponding in Figure 6 to the parts in Figure 2 marked 19, 20, 20a, 21 and 22.

In Figure 7, the modification shown is frusto-pyramidal in character, including, in addition to four frusto-triangular mirror areas 30, 31, 32 and 33, a rectangular mirror area 34.

It is obvious, therefore, that the relative areas of the different mirror sections, and the triangular form of the same, may be varied indefinitely, within the field of the invention, in providing reflecting faces on a traffic mirror head, which is adjustable in all directions, under remote control, so as to enable a driver to observe all possible positions of the field of movement in which he finds himself in.

The hereinafter described construction admits of considerable modification, without departing from the spirit of the invention; therefore, I do not wish to be limited to the precise arrangements shown and described, which are, as aforesaid, by way of illustration merely. In other words, the scope of protection contemplated is to be taken solely from the appended claims, interpreted as broadly as is consistent with the prior art.

I claim as new:

1. In a traffic mirror, the combination, in a body including four faces adapted to expose at each of said faces an inclined and upwardly narrowing mirror so that such four mirrors converge toward their tops, of four such mirrors, and mounting means for said mirrors to coact with the latter to establish said body; said means including an outer frame structure having four downwardly and divergingly inclined corner bars secured together at their tops to define a nonuniplanar spider, each of said bars being of substantially V-shaped cross section, and said means also including an inner frame structure having four walls rigidly joined, with a side edge of each wall merging with a side edge of another wall, and with the opposite side edges of each wall upwardly converged to match the upward inclinations of said corner bars; said mirrors being shaped to fit between said inner and outer frame structures and to be marginally overlapped by said corner bars when said mirrors are interposed between said structures and in contact with both thereof.

2. In a traffic reflecting device, in combination, a body including a plurality of faces having exposed at each of said faces an inclined upwardly narrowing mirror, all such mirrors converging toward their tops to define a pyramidal shape for said body, and mounting means for said mirrors to establish said body.

3. The device defined in claim 2, wherein there are provided secondary mounting means for the means last mentioned including a pivotal mounting, said secondary mounting means securing the device at an advanced exterior point on a motor vehicle well forward of the driver, and remote control means including an actuator within reach of the driver of the vehicle for causing at will a desired pivotal adjustment of said body, thus varying the reflective action of the mirrors relative to the eye of said driver.

In testimony whereof I have affixed my signature.

LOUIS VAN GELDER.